United States Patent
Shimoda

(10) Patent No.: US 7,080,684 B2
(45) Date of Patent: Jul. 25, 2006

(54) MOLD TEMPERATURE CONTROL UNIT

(75) Inventor: Toshio Shimoda, Soka (JP)

(73) Assignee: Sysko Corporation, Saitama-Ken (JP)

( * ) Notice: Subject to any disclaimer, the term of this patent is extended or adjusted under 35 U.S.C. 154(b) by 8 days.

(21) Appl. No.: 10/094,625

(22) Filed: Mar. 12, 2002

(65) Prior Publication Data

US 2003/0085032 A1    May 8, 2003

(30) Foreign Application Priority Data

Nov. 6, 2001    (JP)    ............... 2001-340870

(51) Int. Cl.
*F24F 3/00*    (2006.01)
*B29B 11/08*    (2006.01)

(52) U.S. Cl. .............. 165/205; 165/206; 425/547

(58) Field of Classification Search .............. 165/206, 165/205, 175; 425/143, 547, 548, 549, 552
See application file for complete search history.

(56) References Cited

U.S. PATENT DOCUMENTS

| | | | | |
|---|---|---|---|---|
| 4,017,242 A | * | 4/1977 | Mercer | 425/543 |
| 4,395,222 A | * | 7/1983 | Gaiser et al. | 425/548 |
| 4,497,624 A | * | 2/1985 | Brun et al. | 425/548 |
| 5,761,916 A | * | 6/1998 | Oswalt et al. | 62/127 |
| 5,871,787 A | * | 2/1999 | Fitzgerald et al. | 425/552 |
| 6,179,605 B1 | * | 1/2001 | Littleton et al. | 425/547 |
| 6,471,503 B1 | * | 10/2002 | Priest et al. | 425/547 |

* cited by examiner

*Primary Examiner*—Tho Duong
(74) *Attorney, Agent, or Firm*—Wenderoth, Lind, & Ponack, L.L.P.

(57) ABSTRACT

A mold temperature control unit with which piping connection for supply and drain of cooling water in unit setup can be extremely simply made. In a mold temperature control unit 1 which unit body 2 comprises a plurality of cooling water systems performing supply and drain of cooling water to/from a plurality of elements to be cooled in a mold, a single cooling water supply port 11 and a single cooling water drain port 12 for said plurality of cooling water systems are disposed on the outer panel of the unit body 2.

10 Claims, 4 Drawing Sheets

MOLD TEMPERATURE CONTROL UNIT

BACKGROUND OF THE INVENTION

1. Field of the Invention

The present invention relates to a mold temperature control unit, particularly, to a mold temperature control unit by which it is intended to simplify a piping connection of a cooling water supply port and a cooling water drain port for supply and drainage of cooling water to/from a plurality of elements to be cooled in a mold, i.e., a cavity side part, a force side part, a sprue, and a punch.

2. Prior Art

Conventionally, with a mold temperature control unit whose unit body comprises a plurality of cooling water systems performing supply and drainage of cooling water to/from a plurality of elements to be cooled in a mold, i.e., a cavity side part, a force side part, a sprue, and a punch, respectively, four temperature controlling devices constituting four cooling water systems, for example, are provided in the unit body.

To four cooling water supply ports provided on a rear panel of the unit body, for example, is supplied cooling water, respectively, and from respective cooling water supply ports to the cavity side part, the force side part, the sprue, and the punch is fed temperature controlled cooling water through the four temperature controlling devices.

Further, cooling water which has been circulated through the cavity side part, the force side part, the sprue, and the punch, i.e., cooling drain water is guided to four cooling water drain ports provided on the rear panel of the unit body, for example, and is drained to an exterior.

However, with the conventional mold temperature control unit as configured above, four cooling water supply ports and four cooling water drain ports are provided on the rear panel of the unit body, for example; thus, to operate such conventional mold temperature control unit, it is required to connect a cooling water supply pipe to the four cooling water supply ports and connect a cooling water drain pipe to the four cooling water drain ports in a plant, which presents a problem in that piping connection during setup of the mold temperature control unit is complicated.

SUMMARY OF THE INVENTION

The present invention has been developed in consideration of the above-stated situation, and a purpose is to provide a mold temperature control unit by which piping connection for supply and drainage of cooling water during unit setup can be performed extremely simply.

To solve the above-stated problem, in accordance with a first aspect the invention provides a mold temperature control unit whose unit body comprises a plurality of cooling water systems performing supply and drainage of cooling water to/from a plurality of elements to be cooled in a mold, wherein a single cooling water supply port and a single cooling water drain port for the plurality of cooling water systems are disposed on an outer panel of the unit body.

In accordance with a second aspect, the invention provides a mold temperature control unit whose unit body includes a plurality of cooling water systems performing supply and drainage of cooling water to/from a plurality of elements to be cooled in a mold, comprising: a single cooling water supply port and a single cooling water drain port, for the plurality of cooling water systems, which are disposed on an outer panel of the unit body; a distribution conduit provided in the unit body which distributes cooling water supplied from the single cooling water supply port to the plurality of elements to be cooled; and a collection conduit provided in the unit body which collects cooling water passed through the plurality of elements to be cooled, and feeds this water to the single cooling water drain port.

In accordance with either the first or second aspect of the invention, because a single cooling water supply port and a single cooling water drain port, for a plurality of cooling water systems, are provided on the outer panel of the unit body, in a plant and the like, this mold temperature control unit can be made ready to operate simply by connecting a cooling water supply pipe to the cooling water supply port and connecting a cooling water drain pipe to the cooling water drain port; thus piping connection for supply and drainage of cooling water during unit setup is extremely simplified.

In accordance with either the first or second aspect of the invention, the plurality of cooling water systems performs supply and drainage of cooling water to/from a cavity side part, a force side part, a sprue, and a punch, respectively, which are the elements to be cooled in the mold.

According to this invention, piping connection for supply and drainage of cooling water can be performed extremely simply during setup of the unit body which is connected to a mold comprising a cavity side part, a force side part, a sprue, and a punch.

In accordance with either the first or second aspect of the invention, the elements to be cooled in the mold can include two or more sets of a cavity side part and force side part, a sprue, and a punch.

According to this invention, piping connection for supply and drainage of cooling water can be performed extremely simply during setup of a unit body which is connected to a mold comprising two or more sets of a cavity side part and force side part, a sprue, and a punch, i.e., six or more elements to be cooled.

DETAILED DESCRIPTION OF THE PREFERRED EMBODIMENTS

Hereinbelow, mold temperature control units according to embodiments of the present invention will be specifically described.

Embodiment 1

A mold temperature control unit according to Embodiment 1 of the present invention will be described with reference to FIG. 1 to FIG. 5.

Figure 1:
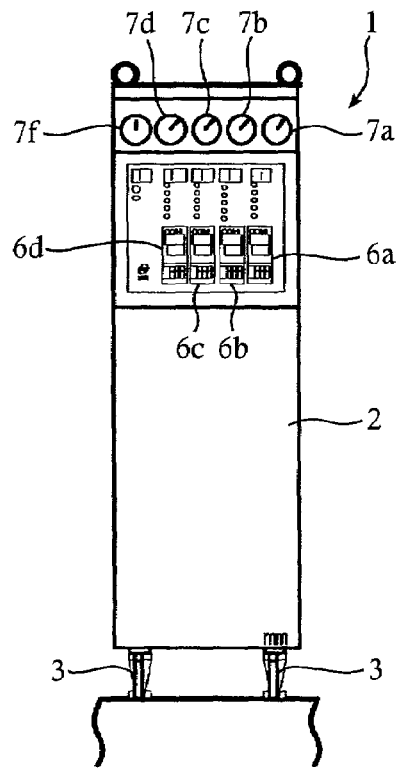
FIG. 1 is a front view of a mold temperature control unit according to Embodiment 1 of the present invention.
Figure 2:
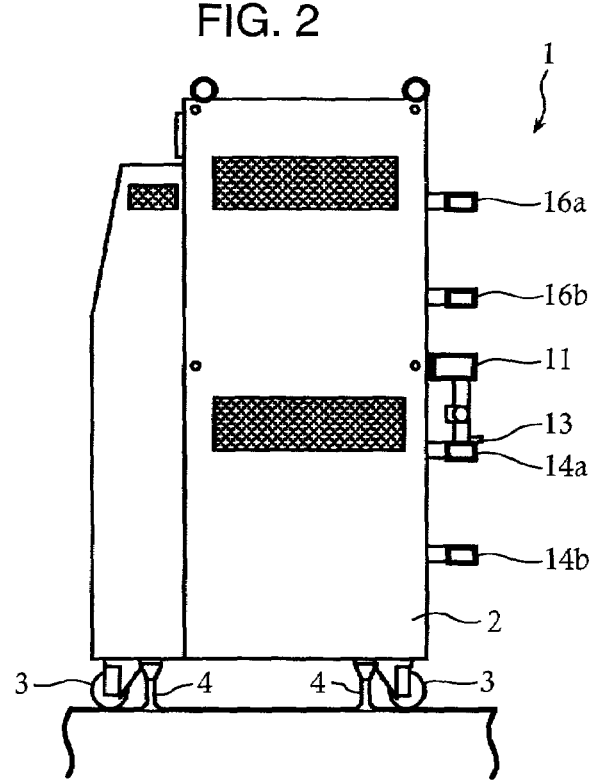
FIG. 2 is a side view of the mold temperature control unit according to Embodiment 1 of the present invention.
Figure 3:
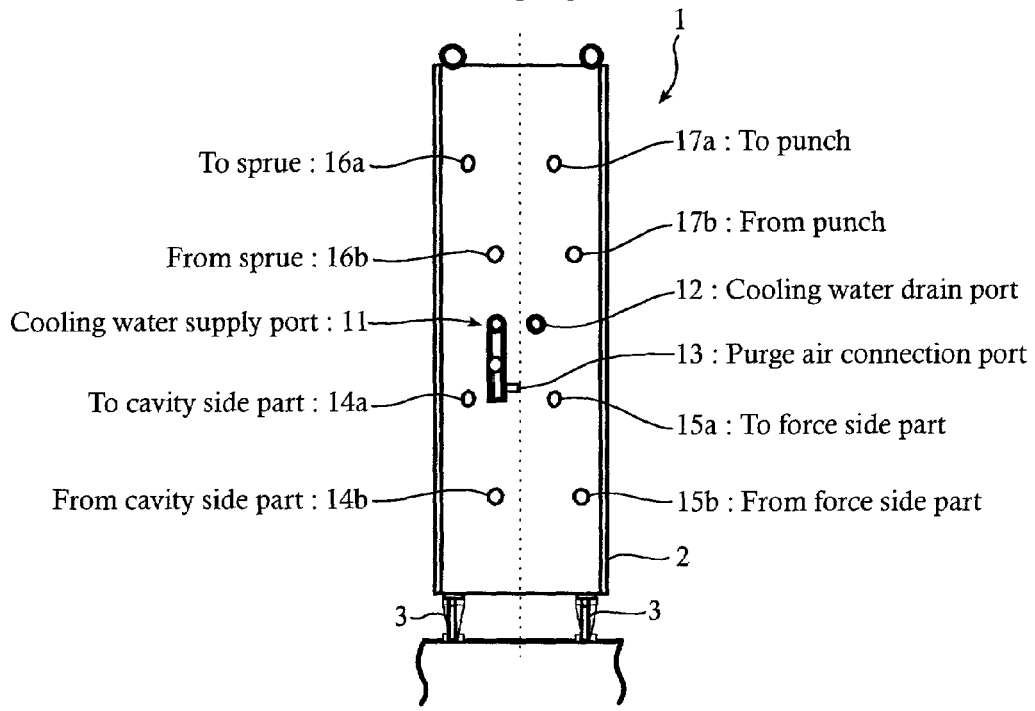
FIG. 3 is a rear view of the mold temperature control unit according to Embodiment 1 of the present invention.
Figure 4:
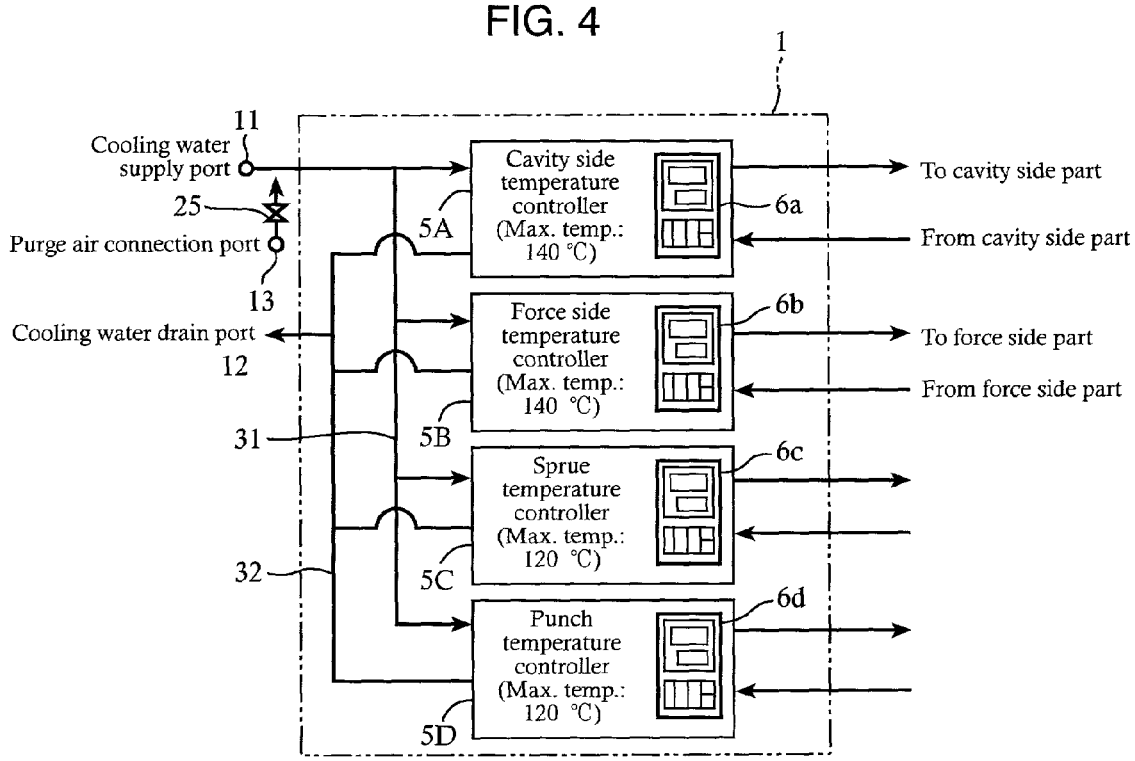
FIG. 4 is a schematic piping system diagram of the mold temperature control unit according to Embodiment 1 of the present invention.
Figure 5:
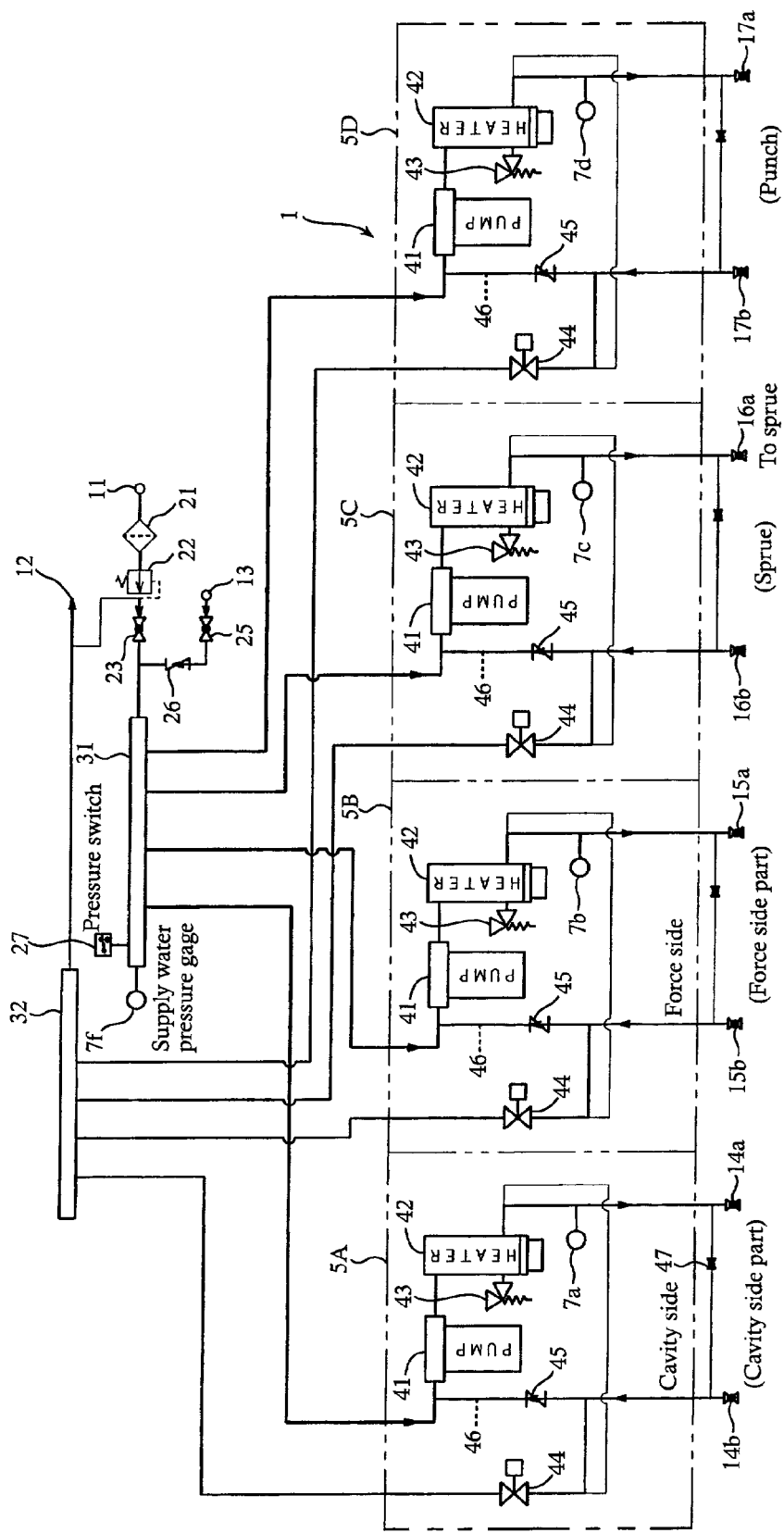
FIG. 5 is a specific piping system diagram for the mold temperature control unit according to Embodiment 1 of the present invention.

FIG. 1 is a front view of the mold temperature control unit according to Embodiment 1, FIG. 2 a side view of the mold temperature control unit according to Embodiment 1, FIG. 3 a rear view of the mold temperature control unit according to Embodiment 1, FIG. 4 a schematic piping system diagram of the mold temperature control unit according to Embodiment 1, and FIG. 5 a specific piping system diagram for the mold temperature control unit according to Embodiment 1.

The mold temperature control unit 1 according to Embodiment 1 comprises a box-like unit body 2, and this unit body 2 is equipped with casters 3 for moving it on a floor and fixing tools 4 for fixing it on the floor, at a bottom of the unit body.

On a front of the unit body 2 are disposed a quadruplet, for example, of controllers constituting temperature controlling devices 5A to 5D (see FIG. 4) in cooling water systems for supplying and draining cooling water to/from elements to be cooled in a mold, i.e., a cavity side part, a force side part, a sprue, and a punch.

The quadruplet of controllers comprises a cavity side part temperature controller 6a, a force side part temperature controller 6b, a sprue temperature controller 6c, and a punch temperature controller 6d, as shown in FIG. 4.

On the front of the unit body 2 are disposed four pressure gages 7a to 7d for the quadruplet of controllers.

Further, a supply water pressure gauge 7f is provided adjacent to the quadruplet of controllers.

Next, with reference to FIG. 3, a constitution of a rear panel of the unit body 2 will be described.

In a nearly central portion of the rear panel of the unit body 2, a single cooling water supply port 11 and a single cooling water drain port 12 for the cooling water systems are disposed in a juxtaposition layout.

In the rear panel of the unit body 2, a purge air connection port 13 is provided under the cooling water supply port 11.

Further, in a lower area of the rear panel of the unit body 2 are provided a supply port 14a (equipped with a stop valve) for cooling water supplied to the cavity side part (not shown) of the mold, a return port 14b (equipped with a stop valve) for cooling water returned from the cavity side part, a supply port 15a (equipped with a stop valve) for cooling water supplied to the force side part (not shown) of the mold, and a return port 15b (equipped with a stop valve) for cooling water returned from the force side part of the mold.

In an upper area of the rear panel of the unit body 2 are provided a supply port 16a (equipped with a stop valve) for cooling water supplied to the sprue (not shown) in the mold, a return port 16b (equipped with a stop valve) for cooling water returned from the sprue, a supply port 17a (equipped with a stop valve) for cooling water supplied to the punch (not shown) in the mold, and a return port 17b (equipped with a stop valve) for cooling water returned from the punch.

FIG. 2 shows the above-mentioned single cooling water supply port 11, supply port 14a, return port 14b, and the like when viewed from a side of the unit body 2.

Next, an entire piping system for the mold temperature control unit according to Embodiment 1 will be described with reference to FIG. 4 and FIG. 5.

With the unit body 2, cooling water supplied from the single cooling water supply port 11 is fed to a distribution conduit 31 through a filter 21, a pressure reducing valve 22, and a stop valve 23, and is divided into four flows, from the distribution conduit 31, to be supplied to the temperature controlling devices 5A to 5D (see FIG. 4) in the cooling water systems, respectively.

On an inlet side of the distribution conduit 31, purge air is supplied from the purge air connection port 13 through stop valves 25 and 26.

To the distribution conduit 31 are connected a pressure switch 27 and the supply water pressure gauge 7f.

On the other hand, four flows of cooling water (cooling drain) drained from the temperature controlling devices 5A to 5D are collected by a collection conduit 32 to be fed to the single cooling water drain port 12.

As shown in FIG. 5, the temperature controlling device 5A has a pump 41 which sucks cooling water from the distribution conduit 31 and feeds this water under pressure; and a heater unit 42 which controllably heats cooling water supplied from the pump 41 to a desired temperature, wherein the cooling water, whose temperature has been controlled by the heater unit 42, is fed to the cavity side part through the supply port 14a.

To the heater unit 42 is connected a relief valve 43, and on an outlet side of the heater unit 42 the pressure gage 7a is connected.

On the other hand, cooling water (cooling drain) returned from the return port 14b to the temperature controlling device 5A after being circulated through the cavity side part is fed to the collection conduit 32 through a solenoid valve 44.

With Embodiment 1, a stop valve 45 and a thermocouple 46 are provided in a pipe line connected between a pipe line for returned cooling water (cooling drain) and a suction side of the pump 41.

In a pipe line connected between the supply port 14a and the return port 14b, a stop valve 47 is provided.

The temperature controlling devices 5B, 5C, and 5D are also constituted in the same manner as the temperature controlling device 5A, respectively.

According to the mold temperature control unit 1 in Embodiment 1 as configured above, the single cooling water supply port 11 and the single cooling water drain port 12 are provided on the rear panel of the unit body 2; thus, in a plant and the like, this mold temperature control unit 1 can be made ready to operate simply by connecting a cooling water supply pipe to the cooling water supply port 11 and connecting a cooling water drain pipe to the cooling water drain port 12, thereby a piping connection for supply and drainage of cooling water during unit setup is extremely simplified.

Embodiment 2

Next, Embodiment 2 of the present invention will be described with reference to FIG. 6.

Figure 6:
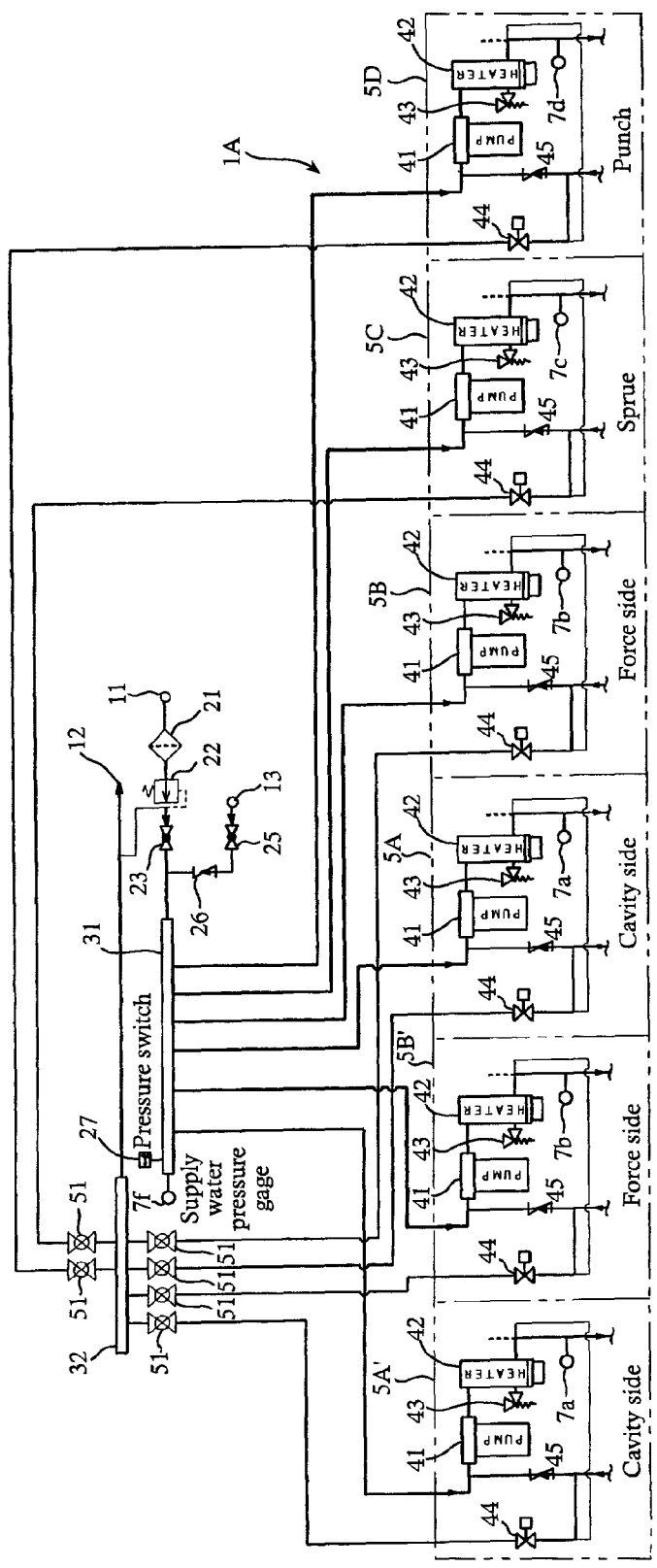
FIG. 6 is a specific piping system diagram for the mold temperature control unit according to Embodiment 2 of the present invention.

For mold temperature control unit 1A of Embodiment 2 as shown in FIG. 6, the same elements as those of the mold temperature control unit 1 of Embodiment 1 as shown in FIG. 5 are provided with the same reference numbers, and detailed description of these elements will be omitted.

With the mold temperature control unit 1A of Embodiment 2, one set of a cavity side part and force side part is added to the configuration of the mold temperature control unit 1 of Embodiment 1, and for a total six elements to be cooled in the mold, six, for example, water cooling systems are provided; however, with the present invention, the mold may be configured so as to have two or more sets of a cavity side part and force side part, and a total of six or more elements to be cooled.

In such a case, in addition to temperature controlling devices 5A to 5D, temperature controlling devices 5A' and 5B' having the same configuration are added with a stop valve 51 being provided in six, for example, pipe lines from respective solenoid valves 44 to collection conduit 32.

Except for this, the mold temperature control unit 1A of Embodiment 2 is configured in the same way as the mold temperature control unit 1 of Embodiment 1.

As with Embodiment 1, the mold temperature control unit 1A of Embodiment 2, which has six cooling water systems in total, can be made ready to function only by performing a simple connection operation; thus piping connection for supply and drainage of cooling water during unit setup is extremely simplified.

The present invention can provide a mold temperature control unit wherein a single cooling water supply port and a single cooling water drain port, for a plurality of cooling water systems, are disposed on an outer panel of a unit body; therefore, in a plant and the like, piping connection for supply and drainage of cooling water during unit setup can be performed extremely simply, and thus a mold can rapidly be made ready to be used.

What is claimed is:

1. A mold temperature control unit comprising:
   a unit body;
   cooling water systems for performing supply and drainage of cooling water to and from elements of a mold to be cooled;
   a single water supply port and a single cooling water drain port, for said cooling water systems, disposed on an outer panel of said unit body;
   a distribution conduit in said unit body for distributing cooling water, supplied to said distribution conduit from said single cooling water supply port, to said cooling water systems so as to cool the elements;
   a collection conduit in said unit body for collecting from said cooling water systems water that has been used to cool the elements, and for feeding this water to said single cooling water drain port; and
   a filter, a pressure reducing valve and a stop valve positioned between said single water supply port and said distribution conduit, such that when cooling water is supplied from said single water supply port the cooling water flows through said filter, said pressure reducing valve and said stop valve and then into said distribution conduit.

2. The mold temperature control unit according to claim 1, wherein
   said cooling water systems are for performing supply and drainage of cooling water to and from the elements by performing supply and drainage of cooling water to and from a cavity side part, a force side part, a sprue and a punch, respectively.

3. A mold temperature control unit comprising:
   a unit body;
   cooling water systems for performing supply and drainage of cooling water to and from elements of a mold to be cooled;
   a single water supply port and a single cooling water drain port, for said cooling water systems, disposed on an outer panel of said unit body;
   a distribution conduit in said unit body for distributing cooling water, supplied to said distribution conduit from said single cooling water supply port, to said cooling water systems so as to cool the elements;
   a collection conduit in said unit body for collecting from said cooling water systems water that has been used to cool the elements, and for feeding this water to said single cooling water drain port; and
   a purge air connection port for supplying purge air into said distribution conduit.

4. The mold temperature control unit according to claim 3, wherein
   said cooling water systems are for performing supply and drainage of cooling water to and from the elements by performing supply and drainage of cooling water to and from a cavity side part, a force side part, a sprue and a punch, respectively.

5. A mold temperature control unit comprising:
   a unit body;
   cooling water systems for performing supply and drainage of cooling water to and from elements of a mold to be cooled;
   a single water supply port and a single cooling water drain port, for said cooling water systems, disposed on an outer panel of said unit body;
   a distribution conduit in said unit body for distributing cooling water, supplied to said distribution conduit from said single cooling water supply port, to said cooling water systems so as to cool the elements;
   a collection conduit in said unit body for collecting from said cooling water systems water that has been used to cool the elements, and for feeding this water to said single cooling water drain port; and
   a pressure switch and a water pressure gauge connected to said distribution conduit.

6. A mold temperature control unit comprising:
   a unit body;
   cooling water systems for performing supply and drainage of cooling water to and from elements of a mold to be cooled;
   a single water supply port and a single cooling water drain port, for said cooling water systems, disposed on an outer panel of said unit body;
   a distribution conduit in said unit body for distributing cooling water, supplied to said distribution conduit from said single cooling water supply port, to said cooling water systems so as to cool the elements; and
   a collection conduit in said unit body for collecting from said cooling water systems water that has been used to cool the elements, and for feeding this water to said single cooling water drain port,
   wherein each of said cooling water systems includes a pump for sucking cooling water from said distribution conduit and feeding this cooling water under pressure to a respective one of the elements to be cooled.

7. The mold temperature control unit according to claim 6, wherein
   each of said cooling water systems further includes a heater for heating cooling water sucked by said pump from said distribution conduit prior to this cooling water being fed under pressure to the respective one of the elements to be cooled.

8. The mold temperature control unit according to claim 7, wherein
   each of said cooling water systems further includes a relief valve and a pressure gauge connected to said heater.

9. The mold temperature control unit according to claim 6, wherein
   said cooling water systems are for performing supply and drainage of cooling water to and from the elements by performing supply and drainage of cooling water to and from a cavity side part, a force side part, a sprue and a punch, respectively.

10. A mold temperature control unit comprising:

a unit body;

cooling water systems for performing supply and drainage of cooling water to and from elements of a mold to be cooled;

a single water supply port and a single cooling water drain port, for said cooling water systems, disposed on an outer panel of said unit body;

a distribution conduit in said unit body for distributing cooling water, supplied to said distribution conduit from said single cooling water supply port, to said cooling water systems so as to cool the elements;

a collection conduit in said unit body for collecting from said cooling water systems water that has been used to cool the elements, and for feeding this water to said single cooling water drain port; and a solenoid valve between each of said cooling water systems and said collection conduit, such that after cooling water has been used to cool a respective one of the elements this water flows through a respective said solenoid valve into said collection conduit.

* * * * *